Feb. 7, 1939.  L. R. UNDERWOOD  2,146,363
PARAFFIN SCRAPER
Filed April 30, 1938
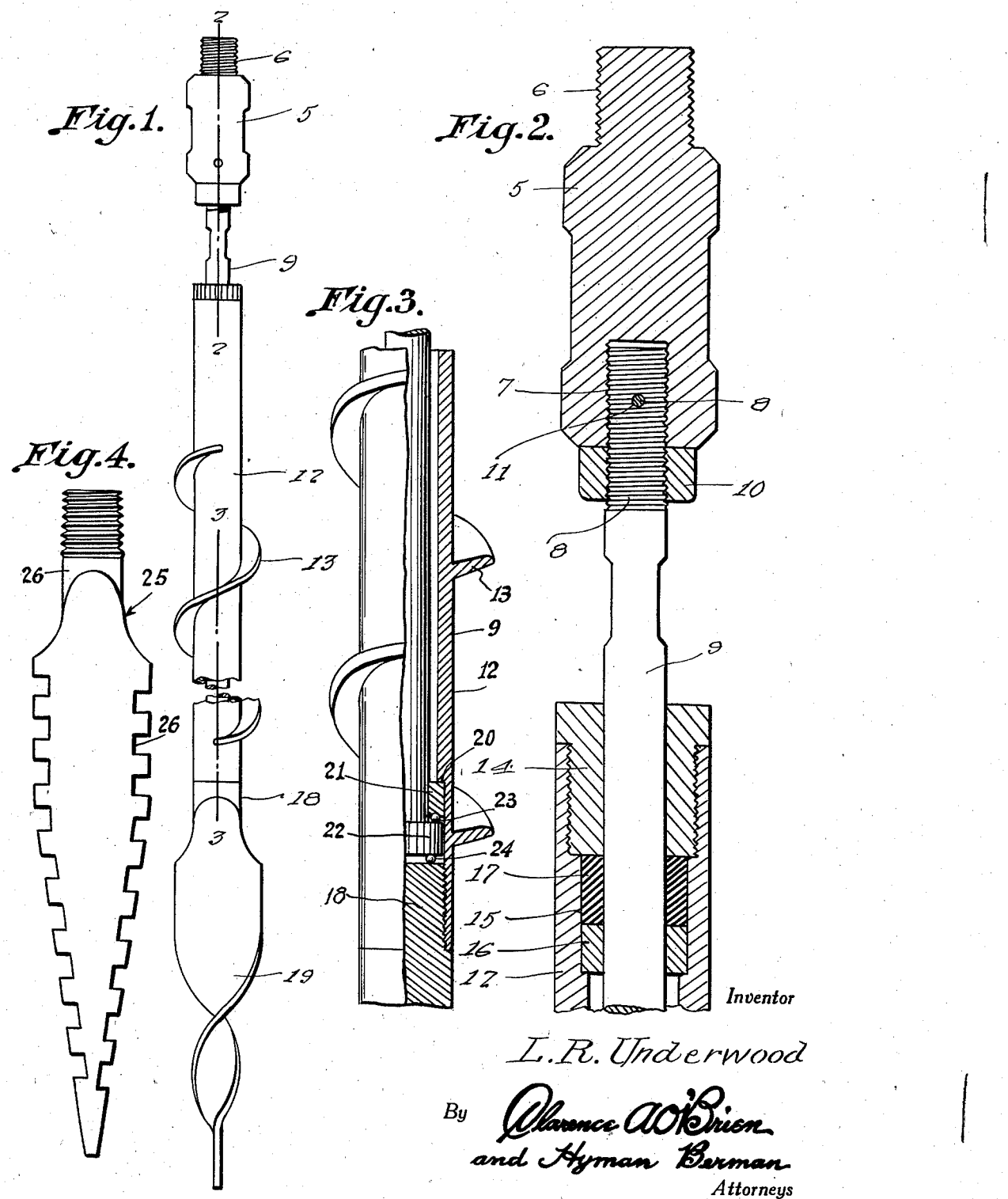
Inventor
L. R. Underwood
By Clarence A. O'Brien
and Hyman Berman
Attorneys Patented Feb. 7, 1939

2,146,363

UNITED STATES PATENT OFFICE 2,146,363

PARAFFIN SCRAPER

Leeman Roy Underwood, Ada, Okla., assignor of one-half to George L. Thompson and Claude V. Thompson, Ada, Okla.

Application April 30, 1938, Serial No. 205,334

2 Claims. (Cl. 166—18)

This invention appertains to new and useful improvements in implements whereby the paraffin in wells can be removed in a practical and efficient manner.

The principal object of the present invention is to provide a tool of the rotary scraper type which will be operated to scrape paraffin from a well tubing by the flow of oil through the tubing.

Still another object of the invention is to provide a scraper which will be positive acting and not susceptible to the ready development of defects.

These and other important objects and advantages of the invention will become apparent to the reader of the following specification.

In the drawing:—

Figure 1 represents a side elevational view.

Figure 2 is an enlarged detailed sectional view taken substantially on the line 2—2 of Figure 1.

Figure 3 is a fragmentary detailed sectional view taken substantially on the line 3—3 of Figure 1.

Figure 4 is a side elevational view of a modified form of scraper.

Referring to the drawing wherein like numerals designate like parts, it can be seen that numeral 5 represents a connector unit having the reduced threaded end 6 and the internally threaded bore 7 at its opposite end for receiving the threaded end portion 8 of the shaft 9. A jam nut 10 is provided on the threaded portion 8 for engagement with the body 5 and a cross pin 11 prevents self turning of the shaft 9 independently of the body 6.

A still line of small diameter is preferably used and connected with the body 5 for suspending the tool in a well.

Numeral 12 represents an elongated sleeve provided with a spirally disposed flange 13 at its outer side extending longitudinally thereof. The upper end of this sleeve is internally threaded to receive the knurled plug 14 through which the shaft 9 extends, the sleeve 12 being counterbored as at 15 to form a shoulder against which the bearing ring 16 can bear and between this bearing ring 16 and the plug 14 is interposed the packing 17.

The lower end of the sleeve 12 is internally threaded to receive the reduced and threaded end portion 18 forming the shank of the spirally formed scraper blade 19. The lower portion of the sleeve 12 is counterbored to form the shoulder 20 against which the bearing 21 bears and is interposed between this bearing 21 and the head portion 22 at the lower end of the shaft 9 is interposed the ball bearing 23 and additional ball bearings 24 are interposed between the bottom of the head 22 and the upper end of the shank 18.

A slightly modified form of scraper is shown in Figure 4 generally referred to by numeral 25. This scraper consists of an elongated tapering blade structure having the threaded shank and the rectangular-shaped cut out 26 along both longitudinal edge portions, defining serrated edges which will offer less resistance in cutting through the paraffin. It can be seen, that as the well flows upwardly through the well its effect on the spiral flange 13 will be to rotate the sleeve 12 independently of the shaft 9, but carry with it the blade 19 which blade will scrape the paraffin from the inside of the tube and allow the same to flow out of the well with the flowing oil.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:—

1. A paraffin scraper comprising a suspended shaft, a sleeve rotatably mounted on the shaft and having a spiral flange extending longitudinally thereon, and a blade at the lower end of the sleeve, and bearing means between the upper and lower ends of the sleeve and the said shaft, said blade being of downwardly reducing size and having serrated longitudinal edge portions.

2. A paraffin scraper comprising a suspended shaft, a sleeve rotatably mounted on the shaft and having an outstanding flanged structure extending longitudinally thereon, said sleeve being provided with internal threads at its lower portion, a scraper blade having a threaded shank disposed into the threaded lower portion of the sleeve, and bearing means between the sleeve and the shaft.

LEEMAN ROY UNDERWOOD.